J. Kerr,

Earth Works.

No. 99,911.   Patented Feb. 15. 1870.

WITNESSES
J. M. Perkins
A. A. Connolly

INVENTOR.
James Kerr,
by
Thos. A. Connolly,
Attorney.

United States Patent Office.

JAMES KERR, OF CORSICANA, TEXAS.

Letters Patent No. 99,911, dated February 15, 1870.

IMPROVEMENT IN FENCE.

The Schedule referred to in these Letters Patent and making part of the same.

I, JAMES KERR, of Corsicana, in the county of Navarro, and State of Texas, have invented certain Improvements in Fencing, of which the following is a specification.

My invention relates to a combination of earth, water, and either hay, straw, stubble, grass, or moss.

The mode of combining the ingredients mentioned is by the use of a peculiarly-constructed apparatus, of which, in the accompanyings drawings—

A is a long box, open at the top and bottom and closed at one end, and can be adapted to any desired length, width, or height.

To construct this box, I make an upright frame of a sufficient number of timbers to give strength to my boxing, which are held together at their lower ends by iron bolts, $a$, with screws and taps.

The upper part of the frame is held together by mortised caps, $a'$, fitting on the upper ends of the upright timbers forming the frame, which are suitably tenoned to receive said caps.

The object of these caps, and of the bolts at the bottom of the frame is to allow the frame to be taken apart readily, as well as to hold it together securely.

Figure 1:
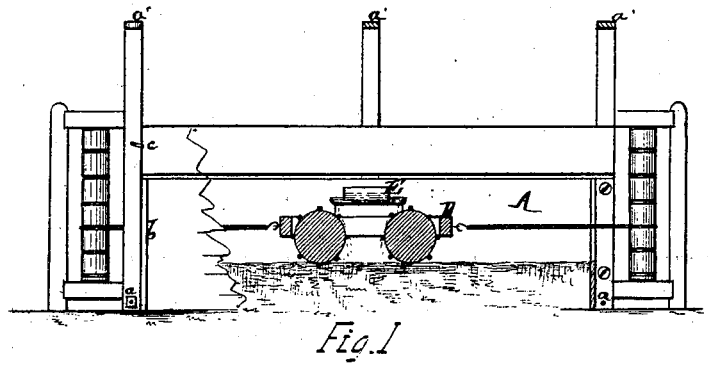
Figure 1 is a side elevation and section, taken longitudinally in the direction of the line $x\ x$, fig. 2.

$b\ b$ are braces on either side of the frame, and attached to the timbers forming the frame, as shown in fig. 1.

The frame so constructed is lined inside with planks, made fast to the frame, to the height of two or three feet.

Additional planks may be added, as necessity may require in constructing the fence, which planks are provided with iron rods, $c\ c$, bent at right angles, as shown in the drawings, and made to turn in their places, so as to take hold of the frame timbers, to secure the planks in their proper places.

The mode of mixing and packing the ingredients together to form the fence is as follows:

Two wheels are constructed of suitable weight, material, and dimensions, with radial flanges or spurs around their peripheries, of proper size, and arranged at suitable distances apart, so as to work and pack the ingredients together.

These wheels are placed in a frame, D, of sufficient width to admit of their turning freely.

The said frame is constructed of a proper width to be moved back and forth inside the long box, the sides of which serve as a guide for the frame with wheels.

On the top of this frame, midway between the packing wheels, is constructed a cistern or tank, E, to contain water, which is allowed to flow therefrom on the fence composition, in sufficient quantity to give it the right consistency for mixing and packing, by means of cocks or other suitable means of water escape with which the cistern is provided.

Figure 2:
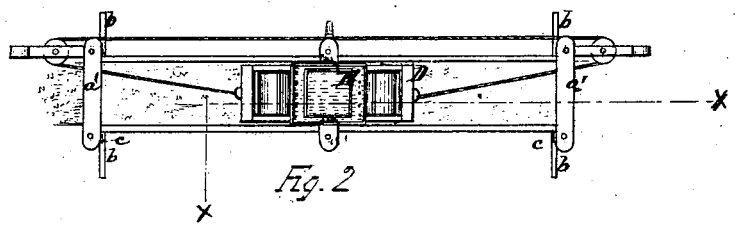
Figure 2 is a top view.

The propelling power of the packing car, consisting of the frame with flanged wheels and water-cistern, may be either animal or steam. For this purpose, the frame has a staple in either end to hold hooks on the ends of a rope, which passes around suitable pulleys or rollers at the ends of the box, thence outside the said box, as clearly shown in fig. 2 of accompanying drawings. To this rope, or any other equivalent that may be employed, an animal may be hitched, or the power communicated, so that, by drawing the rope in either directions, the car is moved to and fro lengthwise of the box.

I do not claim any of the ingredients composing the fence, nor as new the side-boards of which the box is constructed; but

I claim as my invention—

1. The packing device consisting of the frame D, having the flanged or spurred wheels and water-cistern, as described, and used as specified, in combination with the box A, for the purpose set forth.

2. The pulleys at either end of the box A, in combination with the packing device, as described, and for the purpose specified.

JAMES KERR.

Witnesses:
WILLIAM FRANKLIN WOODWARD,
NATHANIEL HENRY BUTLER.